(12) United States Patent
Molgaard et al.

(10) Patent No.: US 9,982,582 B2
(45) Date of Patent: May 29, 2018

(54) CLEANING SYSTEM AND METHOD FOR REDUCTION OF SOX IN EXHAUST GASES

(71) Applicant: ALFA LAVAL CORPORATE AB, Lund (SE)

(72) Inventors: Soren Molgaard, Stovring (DK); Jens Peter Hansen, Aalborg (DK)

(73) Assignee: ALFA LAVAL CORPORATE AB, Lund (SE)

( * ) Notice: Subject to any disclaimer, the term of this patent is extended or adjusted under 35 U.S.C. 154(b) by 76 days.

(21) Appl. No.: 14/442,747

(22) PCT Filed: Mar. 4, 2014

(86) PCT No.: PCT/EP2014/054109
§ 371 (c)(1),
(2) Date: May 14, 2015

(87) PCT Pub. No.: WO2014/135509
PCT Pub. Date: Sep. 12, 2014

(65) Prior Publication Data
US 2015/0292379 A1     Oct. 15, 2015

(30) Foreign Application Priority Data
Mar. 8, 2013   (EP) ..................................... 13158355

(51) Int. Cl.
*F01N 3/08*   (2006.01)
*B01D 53/14*   (2006.01)
(Continued)

(52) U.S. Cl.
CPC ......... *F01N 3/085* (2013.01); *B01D 53/1406* (2013.01); *B01D 53/1481* (2013.01);
(Continued)

(58) Field of Classification Search
CPC .......................... B01D 47/06; B01D 53/1406; B01D 53/1481; B01D 2247/04; B01D 2257/302;
(Continued)

(56) References Cited

U.S. PATENT DOCUMENTS 3,870,781 A    3/1975  Klein et al.
4,040,266 A    8/1977  Frank et al.
(Continued)

FOREIGN PATENT DOCUMENTS

CN    102910764 A    2/2013
DE    29 13 580 A1   10/1980
(Continued)

OTHER PUBLICATIONS

International Search Report (PCT/ISA/210) dated May 27, 2014, by the European Patent Office as the International Searching Authority for International Application No. PCT/EP2014/054109.
(Continued)

*Primary Examiner* — Frank Lawrence
(74) *Attorney, Agent, or Firm* — Buchanan Ingersoll & Rooney PC

(57) ABSTRACT

A cleaning system for reducing SOx and particulate matter in exhaust gases from a marine combustion engine, burner or boiler. The cleaning system comprises first and second scrubber process loops having first and second scrubber, respectively, and first and second water circulation tanks, respectively. Water from the first tank is evaporated to water vapor inside the first scrubber by contact with the exhaust gases, whereby the water vapor and the exhaust gases form humid exhaust gases. The humid exhaust gases are transferred to the second scrubber, wherein water from the second tank condensates the water vapor in the humid exhaust gases. A reflux of water from the second scrubber process loop to the first scrubber process loop is provided. At least
(Continued)

60% and more preferred at least 90% of a total amount of alkaline agent supplied to the cleaning system is supplied to the second scrubber process loop.

20 Claims, 1 Drawing Sheet

(51) Int. Cl.
  *F01N 3/04* (2006.01)
  *F01N 3/025* (2006.01)
  *B01D 47/06* (2006.01)

(52) U.S. Cl.
  CPC ............. *F01N 3/025* (2013.01); *F01N 3/04* (2013.01); *B01D 47/06* (2013.01); *B01D 2247/04* (2013.01); *B01D 2257/302* (2013.01); *B01D 2259/4566* (2013.01); *F01N 2570/04* (2013.01); *F01N 2590/02* (2013.01); *Y02T 10/20* (2013.01)

(58) Field of Classification Search
  CPC ... B01D 2259/4566; F01N 3/04; F01N 3/085; F01N 2570/04; F01N 2490/02; Y01T 10/20
  USPC ......... 95/149, 187, 195, 199, 200, 223–225, 95/230, 235; 96/243; 423/242.1, 243.01
  See application file for complete search history.

(56) References Cited

U.S. PATENT DOCUMENTS

| | | | |
|---|---|---|---|
| 4,294,807 A | 10/1981 | Randolph | |
| 4,331,640 A | 5/1982 | Morita et al. | |
| 4,460,552 A * | 7/1984 | Zakrzewski | B01D 53/14 261/98 |
| 4,719,088 A | 1/1988 | Itoh et al. | |
| 4,936,880 A | 6/1990 | Sundberg | |
| 5,328,673 A * | 7/1994 | Kaczur | B01D 53/502 423/235 |
| 6,001,321 A | 12/1999 | Okazoe et al. | |
| 6,099,816 A | 8/2000 | College et al. | |
| 7,530,552 B1 | 5/2009 | Rumell et al. | |
| 7,976,809 B2 | 7/2011 | Anttila et al. | |
| 8,329,128 B2 * | 12/2012 | Dube | B01D 53/343 422/168 |
| 2003/0059352 A1 | 3/2003 | Karras et al. | |
| 2008/0044335 A1 | 2/2008 | Anttila et al. | |
| 2011/0000191 A1 | 1/2011 | Scappatura | |
| 2011/0033359 A1 | 2/2011 | Papenheim et al. | |
| 2011/0052453 A1 * | 3/2011 | McLarnon | B01D 53/501 422/170 |
| 2014/0248201 A1 * | 9/2014 | Hansen | B01D 47/00 423/212 |

FOREIGN PATENT DOCUMENTS

| | | |
|---|---|---|
| EP | 0162536 A1 | 11/1985 |
| EP | 0 628 342 B1 | 12/1996 |
| EP | 1 857 169 A1 | 11/2007 |
| EP | 1 952 007 B1 | 7/2011 |
| JP | 57-10770 A | 1/1982 |
| JP | 61204022 A | 9/1986 |
| JP | 6223420 A | 1/1987 |
| JP | 08-503165 A | 4/1996 |
| JP | 0951534 A | 2/1997 |
| JP | 3621597 B2 | 2/2005 |
| JP | 2006241976 A | 9/2006 |
| KR | 1989-0002852 B1 | 8/1989 |
| WO | 94/12429 A1 | 6/1994 |
| WO | 2007045721 A1 | 4/2007 |
| WO | WO 2007/057573 A1 | 5/2007 |
| WO | WO 2008/015487 A1 | 2/2008 |
| WO | WO 2009/105894 A1 | 9/2009 |
| WO | WO 2012/113977 A1 | 8/2012 |
| WO | 2013/045272 A1 | 4/2013 |

OTHER PUBLICATIONS

Written Opinion (PCT/ISA/237) dated May 27, 2014, by the European Patent Office as the International Searching Authority for International Application No. PCT/EP2014/054109.

Office Action (First) dated Feb. 28, 2017, by the State Intellectual Property Office of the Peoples Republic of China in corresponding Chinese Patent Application No. 201480012860.5, and an English translation of the Office Action. (13 pgs).

Chinese Search Report dated Feb. 17, 2017, by the State Intellectual Property Office of the Peoples Republic of China in corresponding Chinese Patent Application No. 201480012860.5, and an English translation of the Search Report. (5 pgs).

Dr. Brigitte Behrends et al., "Reducing SO2 and NOx emissions from Ships by a seawater scrubber", Research Centre Terramare, Apr. 17, 2003, pp. 1-37, Wilhelmshaven Germany.

\* cited by examiner

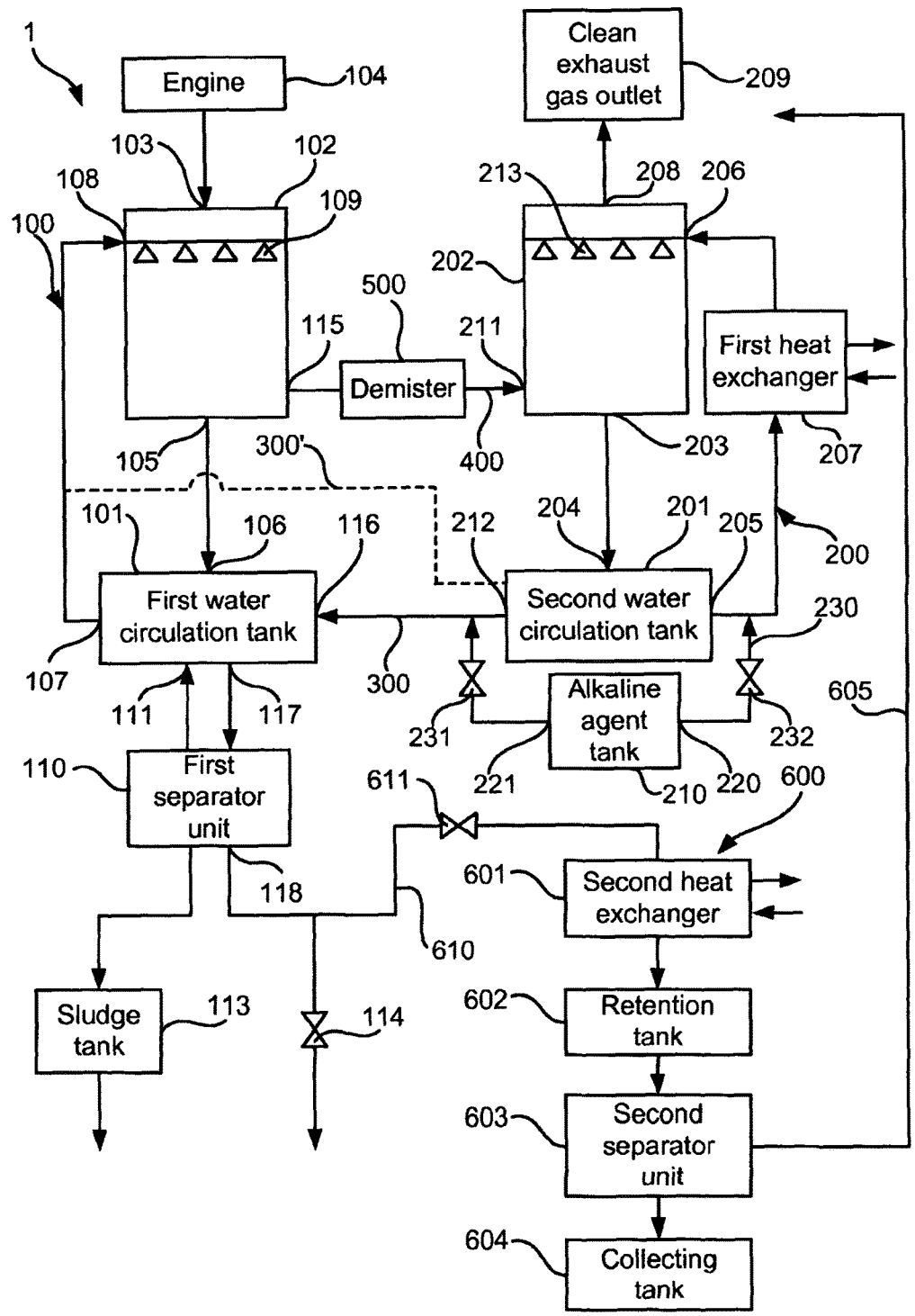

CLEANING SYSTEM AND METHOD FOR REDUCTION OF SOX IN EXHAUST GASES

TECHNICAL FIELD

The invention relates to a cleaning system and method for the reduction of SOx and particulate matter in exhaust gases from a marine combustion engine, burner or boiler. The invention also relates to the use of such system.

BACKGROUND

During the combustion of fossil fuels, sulphur in the fuel is released in form of sulphur oxides ($SO_x$). Other pollutants are primary particulate matter, such as soot, oil and heavy metal particles, and nitrogen oxides ($NO_x$). It is well known that air pollution seriously impact people's health and the environment. It is also well known that sulphur dioxide and nitrogen oxides are the major precursors of acid rain.

Present regulations regarding emission control for international shipping include caps on the sulphur content of fuel oil as a measure to control $SO_x$ emissions. Special fuel-quality provisions exist for $SO_x$ in emission control areas and there are substantial reductions in the allowed fuel sulphur limits to be expected in the near future. The MARPOL Annex VI legislation, which went into effect in May 2005 following specifications from several European Union directives, has curbed the impact of marine diesel on the environment. By 2015, the legislations will be even stricter regarding by way of example fuel sulphur limits and NOx cap.

There are different emission reduction possibilities, either taken alone or in combination. One possibility is to use new fuels such as distillate fuels or low sulphur fuels. Another possibility is to further develop methods to control the emission of $SO_x$ such as wet scrubber technologies, typically used on-board ships, using alkaline agents such as NaOH-solutions, or dry scrubber technologies using granulates of hydrated lime ($Ca(OH)_2$).

It is well known in the marine industry today for the purpose of reducing $SO_x$ in the exhaust from a ship engine to apply Exhaust Gas Cleaning (EGC).

One well known wet scrubber of the EGC type is a so called closed loop scrubber which uses circulating freshwater in combination with an alkaline agent like sodium hydroxide (NaOH) or sodium carbonate ($Na_2CO_3$) to wash out sulphur oxides and soot particles from the exhaust gas. To control the quality of the circulating freshwater a small amount of it may occasionally or continuously be replaced by clean fresh water and either be stored on the ship or be discharged over board after cleaning.

Although scrubbers of the above mentioned type are well known in the art, several unsolved or problematic issues remain. Water consumption of a closed loop scrubber system due to evaporation is generally so high that large amounts of fresh water have to be added continuously to the system to keep it in balance. Further, water cleaning in a closed loop scrubber system is critical. If the water is too dirty it is not allowed to be discharged, and it can be difficult to avoid a build-up of soot inside the scrubber system which may eventually block valves and nozzles and cause malfunction of scrubber system components. Also, the consumption of pH neutralizing chemicals like NaOH or $Na_2CO_3$ is so large that it becomes expensive to operate the scrubber system.

EP 1 857 169 A1 discloses a fresh water scrubber system comprising a two section scrubber, wherein the first section is intended for sulphur removal whereas the second section is intended for condensation.

SUMMARY

An object of the invention is to provide a system allowing a reduced freshwater consumption.

This is achieved by means of a cleaning system for the reduction of SOx and particulate matter in exhaust gases from a marine combustion engine, burner or boiler, the cleaning system comprising:

a first scrubber process loop comprising a first scrubber and a first water circulation tank, wherein water from the first water circulation tank is arranged to circulate in the first scrubber process loop, the first scrubber being arranged to receive exhaust gases from the combustion engine, burner or boiler and water from the first water circulation tank, which water, at least partly, is arranged to be evaporated to water vapor inside the first scrubber by contact with the exhaust gases, whereby the water vapor and the exhaust gases form humid exhaust gases;

a second scrubber process loop comprising a second scrubber and a second water circulation tank, wherein water from the second water circulation tank is arranged to circulate in the second scrubber process loop, a communication between the first and the second scrubber allowing transfer of the humid exhaust gases from the first scrubber to the second scrubber; the second scrubber being arranged to receive water from the second circulation tank, which water is arranged to condensate, inside the second scrubber, the water vapor in the humid exhaust gases at least partly; and a communication between the first and the second scrubber process loop allowing a reflux of water from the second scrubber process loop to the first scrubber process loop, the cleaning system further comprising an arrangement for supply of an alkaline agent to at least the second scrubber process loop, wherein at least 60% and more preferred at least 90% of the total amount of the alkaline agent supplied to the cleaning system is supplied to the second scrubber process loop.

The inventive cleaning system has two sections—the first scrubber process loop and the second scrubber process loop. The first scrubber process loop is, due to the contact with hot exhaust gases, warm, whereby a large amount of water evaporates. Thus, the first scrubber process loop is to be regarded as an evaporation loop. In the first scrubber process loop the exhaust gases are cleaned from particulate matter, as will be further described hereinafter.

The second scrubber process loop is, as compared to the first scrubber process loop, colder whereby the evaporated water condenses at least partly and returns into liquid form. The evaporation leaves impurities like salts and particulate matter behind and thereby results in a net-transport of pure water vapor from the first scrubber process loop to the second scrubber process loop. The wording "pure" as used throughout this document is to be interpreted as meaning essentially free of sulfate salts and particulate matter.

Further, by the second scrubber process loop being provided with at least 60% and more preferred at least 90% of the total amount of the alkaline agent supplied to the cleaning system, SOx contained in the humid warm exhaust gases fed to the second scrubber will be washed out from the exhaust gases and oxidize into aqueous sulphite and sulphate salts. Thus, the second scrubber process loop is to be regarded as a cleaning loop, cleaning the exhaust gases from SOx.

By the reflux, the dirty water resulting from the above SOx cleaning is returned to the first scrubber process loop. Thereby, salts and particulate matter will accumulate and concentrate in the first scrubber process. Simulations have shown that the concentrations of salts and particulate matter will be up to 20 times higher in the first scrubber process loop than in the second scrubber process loop. As will be further discussed below, this is a result of the evaporation, condensation and reflux taking place in the cleaning system.

The second scrubber process loop may comprise a first heat exchanger adapted to cool the water being arranged to circulate in the second scrubber process loop.

The cleaning system may be adapted to maintain a temperature of the water arranged to be received by the second scrubber in the range of 0-35° C. Cooling of the water to this temperature may be made by a heat exchanger using e.g. seawater as refrigerant. It is to be understood that the seawater temperature varies depending on geography and time of the year. Generally, the lower temperature, the more water will condense from the humid exhaust gases. It is to be understood that other refrigerants than sea water may be used.

The cleaning system may be adapted to maintain a temperature of the water arranged to be received by the first scrubber in the range of 40-70° C. This temperature range is made available due to a balancing effect by the water circulating in the first scrubber process loop meeting the hot exhaust gases.

The cleaning system may be adapted to adjust the supply of the alkaline agent to the second scrubber process loop such that a pH value of the water arranged to be received by the second scrubber is in the range of 6-10 and more preferred in the range of 7-8. A pH value within this range may provide optimal removal of SOx from the exhaust gas. It is not desirable to operate with a high inlet pH value, such as with an inlet pH value of 9 or more, in a traditional scrubber (e.g. as disclosed in EP01857169A1) as this will result in an excessive consumption of alkaline agents as well as the discharge water might exceed allowable pH discharge limits. According to this invention, the excess alkaline constituents from the second scrubber stage are not discharged but consumed in the first scrubber stage.

The cleaning system may be adapted to maintain a pH value of the water arranged to be received by the first scrubber in the range of 2-8 and more preferred in the range of 2-4. A low pH value enables a reduced consumption of alkali agent in the cleaning system, which will be further discussed below.

Generally the scrubbing effect in a scrubber is determined by the alkalinity of the scrubbing water. The purpose of the first scrubber process loop is primarily evaporation of the water to provide humid exhaust gases to be transferred to the second scrubber process loop in which the cleaning of SOx is to take place together with condensing of the humidity of the exhaust gases. The pH value of the water in the first scrubber process loop has no major impact on the evaporation process and may therefore be kept as low as possible. It is however to be known that the normal discharge criteria is a pH value above 6.5 whereby a pH value adjustment may be required before discharge.

The alkaline water being refluxed from the second scrubber loop will dilute when meeting the water in the first scrubber process loop without contributing significantly to any neutralization of the SOx contained in the exhaust gases being fed to the first scrubber. Generally there is no need to add any alkaline agent to the water in the first scrubber process loop.

The cleaning system may comprise a first separator unit communicating with the first scrubber process loop. The first separator unit is used to remove particulate matter concentrating in the water in the first scrubber process loop.

The cleaning system may further comprise a water cleaning arrangement adapted to be supplied with remnant water from the first separator unit, wherein the water cleaning arrangement comprises a second heat exchanger adapted to cool the remnant water in order for salts contained therein to precipitate, and a second separator unit adapted to separate the precipitated salts from the cooled remnant water. The cooled remnant water cleaned from precipitated salts may be returned to the second scrubber process loop.

According to another aspect, the invention relates to a method of reducing SOx and particulate matter in exhaust gases from a marine combustion engine, burner or boiler by using a cleaning system, the cleaning system comprising:

a first scrubber process loop comprising a first scrubber and a first water circulation tank;

a second scrubber process loop comprising a second scrubber and a second water circulation tank;

a communication between the first and the second scrubber;

a communication between the first and the second scrubber process loop; and an arrangement for supply of an alkaline agent to at least the second scrubber process loop; the method comprising:

circulating water from the first water circulation tank in the first scrubber process loop, circulating water from the second water circulation tank in the second scrubber process loop, supplying at least 60% and more preferred at least 90% of the total amount of the alkaline agent supplied to the cleaning system to the second scrubber process loop, receiving exhaust gases from the combustion engine, burner or boiler, and water from the first water circulation tank, in the first scrubber, which water, at least partly, is evaporated to water vapor inside the first scrubber by contact with the exhaust gases, whereby the water vapor and the exhaust gases form humid exhaust gases, transferring the humid exhaust gases from the first scrubber to the second scrubber, receiving water from the second circulation tank in the second scrubber, which water condensates, inside the second scrubber, the water vapor in the humid exhaust gases at least partly, whereby SOx contained in the exhaust gases oxidizes into sulphates; and providing a reflux of water from the second scrubber process loop to the first scrubber process loop.

The method is based on a cleaning system having essentially the same configuration as the cleaning system discussed above. Thus, the same advantages are offered and to avoid undue repetition, reference is made to the sections above.

According to yet another aspect, the invention relates to the use of the cleaning system above onboard a ship for the purpose of reduction of $SO_x$ and particulate matter in exhaust gases from the marine combustion engine, burner or boiler.

Further objects and features will be apparent from the detailed description and the claims.

DRAWINGS

One embodiment of the invention will now be described, by way of example, in more detail with reference to the appended drawing in which:

The drawing FIGURE is a schematic overview of the inventive system.

DETAILED DESCRIPTION

In the drawing FIGURE a cleaning system 1 is illustrated. The cleaning system 1 is used on-board a ship to clean exhaust gases from a combustion engine 104. More particularly, the cleaning system 1 is arranged to remove particulate matter and acid gases such as SOx from the exhaust gases by flushing the exhaust gases with water. As will be further discussed below, the particulate matter is removed from the exhaust gases by being dissolved in the water which is then separated from the exhaust gases. Further, SOx is removed from the exhaust gases by flushing them with water containing an alkaline agent, e.g. NaOH, whereby the SOx reacts with oxygen and the alkaline agent to form salt dissolved in water.

The cleaning system 1 comprises a first scrubber process loop 100 having a first water circulation tank 101 and a second scrubber process loop 200 having a second water circulation tank 201.

The cleaning system 1 is to be regarded as a closed freshwater system, i.e. it is operated on freshwater circulating in the cleaning system 1 with no continuous supply of new freshwater. It is to be understood that new freshwater of course may be supplied to replace freshwater being discharged as e.g. vapour, remnant water or waste water together with sludge.

Starting with the first scrubber process loop 100, this comprises a first scrubber 102 having a first inlet 103 connected to an exhaust of the combustion engine 104 to receive exhaust gases there from. Further, the first scrubber 102 is connected via a first outlet 105 thereof to a first inlet 106 of the first water circulation tank 101, which tank in turn is connected via a first outlet 107 thereof to a second inlet 108 of the first scrubber 102. Thereby a circulating flow of water is allowed between the first scrubber 102 and the first water circulation tank 101.

The water supplied to the first scrubber 102 is distributed inside thereof via a plurality of nozzles 109. This is well known in the art whereby no further explanation is given. Further, as is also well known in the art, the residence time of the water inside the first scrubber 102 may be increased by the first scrubber comprising random or structured packed bed materials or by re-circulating some water from a top to a bottom of the first scrubber by aid of an additional pump and additional spraying nozzles (not shown).

The water circulating in the first scrubber process loop 100 has a pH value in the range of 2-8 and more preferred in the range of 2-4 as measured at the second inlet 108 of the first scrubber 102. Thus, the water received by the first scrubber has a pH value in the range of 2-8 and more preferred in the range of 2-4.

In order of taking care of pollutants, such as particulate matter, concentrating in the first water circulation tank 101 during operation of the cleaning system 1, as will be further discussed below, the first water process loop 100 is connected to a first separator unit 110. The first separator unit 110 is connected to the first water circulation tank 101 via a second outlet 117 thereof. The first separator unit 110 may by way of example be a high speed separator well known in the art.

The first separator unit 110 is arranged to separate dirty water into sludge, containing particulate matter, and remnant water. The sludge collected by the first separator unit 110 may be collected in a sludge tank 113 for later controlled discharge, such as during a port stop.

The remnant water may be reintroduced in the first scrubber process loop 100 via a second inlet 111 of the first water circulation tank 101 or be discharged via a first outlet 118 of the first separator unit 110, a valve arrangement 114 and an overboard discharge pipe (not disclosed).

The remnant water may be subjected to a quality control (not disclosed) to see whether it's quality meets legislated overboard discharge criteria or not. By way of example there are overboard discharge criteria stating maximum levels of organic compounds, suspended solids also known as turbidity and pH value when bleeding-off the remnant water into the sea.

If the quality is deemed acceptable, the remnant water may be discharged overboard. If deemed not acceptable, or if discharge is not allowed due to a port stop or the ship being in a sensitive area, the remnant water may be collected in a remnant water tank (not disclosed) for later discharge.

The first separator unit 110 may be set to be operated and thus fed with water from the first water circulation tank 101 when the contamination level of the water circulating in the first scrubber process loop is determined to have reached a pre-set level during operation. It may also be set to take place with pre-set time intervals.

As will be described below, the first separator unit 110 separates dirt, such as particulate matter, washed out from both the first and second scrubber process loops 100, 200. This is because the first separator unit 110 is fed with water from the first water circulation tank 101 which in turn, directly or indirectly, is fed with water from the second water circulation tank 201.

Now turning to the second scrubber process loop 200, this comprises a second scrubber 202. A first outlet 203 of the second scrubber 202 is connected to a first inlet 204 of the second water circulation tank 201. A first outlet 205 of the second water circulation tank 201 is connected to a first inlet 206 of the second scrubber 202 via a first heat exchanger 207. Thereby a circulating flow of water is allowed between the second scrubber 202 and the second water circulation tank 201. Further a second outlet 208 of the second scrubber 202 is connected to a clean exhaust gas outlet 209. The water supplied to the second scrubber 202 is distributed inside thereof via a plurality of nozzles 213. This is well known in the art whereby no further explanation is given.

The first heat exchanger 207, e.g. a plate heat exchanger, is arranged to cool the water circulating between the second water circulation tank 201 and the second scrubber 202. The refrigerant used for cooling may in its easiest form be sea water provided via a piping (not disclosed) in the hull.

The cleaning system 1 comprises an arrangement 230 for supply of an alkaline agent comprising an alkaline agent tank 210 holding the alkaline agent and valves 231, 232.

The alkaline agent tank 210 is arranged with a first outlet 220 allowing a supply of the alkaline agent to the second process loop 200 in a position between the first outlet 205 of the second water circulation tank 201 and the first heat exchanger 207. Further, the alkaline agent tank 210 is arranged with a second outlet 221 allowing a supply of the alkaline agent to the first process loop 100. This supply is made via a communication 300 extending between a second outlet 212 of the second water circulation tank 201 and a third inlet 116 of the first water circulation tank 101. Alternatively, the supply of the alkaline agent to the first scrubber process loop 100 could be made in another position, such as via a communication 300' extending between the second outlet 212 of the second scrubber water circulation tank 201 and the second inlet 108 of the first scrubber 102.

The supply of the alkaline agent may be controlled by the valves 231, 232.

It is to be understood that the alkaline agent tank 210 equally well may be arranged in another position, e.g. between the first heat exchanger 207 and the first inlet 206 of the second scrubber 202.

At least 60% and more preferred at least 90% of the total amount of the alkaline agent supplied to the cleaning system 1 should be supplied to the second process loop 200.

The alkalinity of the water circulating in the second process loop 200 is adjusted with the alkaline agent to a pH value in the range of 6-10 and more preferred in the range of 7-8 as measured at the first inlet 206 of the second scrubber 202. Thus, the water received by the second scrubber has a pH value in the range of 6-10 and more preferred in the range of 7-8.

The alkaline agent may e.g. be sodium hydroxide (NaOH) or sodium carbonate ($Na_2CO_3$). It is to be understood by the skilled person that also other alkaline agents may be used. It is also to be understood that the alkalinity of the water and thus the dosage of the alkaline agent may be controlled by a non-disclosed control equipment.

The first scrubber process loop 100 is arranged in communication with the second scrubber process loop 200 by a communication 400 extending between a second outlet 115 of the first scrubber 102 and a second inlet 211 of the second scrubber 202. Further, the second scrubber process loop 200 is arranged in communication with the first scrubber process loop 100 by the communication 300 and/or the communication 300'.

Thereby a flow, i.e. a reflux of water, is allowed from the second water tank 201 to the first scrubber process loop 100, via the communication 300 and/or the communication 300', while also a flow of humid exhaust gases is allowed from the first scrubber 102 to the second scrubber 202 via the communication 400. This will be discussed in detail below.

In the following, operation of the cleaning system 1 will be discussed.

During operation, hot and dirty exhaust gases will enter the first scrubber 102 with a temperature of about 180-350° C. Inside the first scrubber 102 the exhaust gases will be subjected to a flow of water supplied from the nozzles 109 which in the disclosed embodiment are arranged at the top of the first scrubber 102. The water is supplied from the first water circulation tank 101.

By the water meeting the hot exhaust gases, a large amount of the water will evaporate to water vapor while at the same time the temperature of the exhaust gases is lowered. It is to be understood that the evaporation must not be complete, which can be guaranteed by a sufficient water flow in the first scrubber process loop. As an example, a degree of evaporation could be such that at least 50% of the water received in the first scrubber remains in liquid form. The water vapor is intermixed with the exhaust gases to form humid exhaust gases which are transferred into the second scrubber 202 via the communication 400.

To avoid transfer of water in liquid form, i.e. not evaporated water, from the first scrubber process loop 100 to the second scrubber process loop 200, a demister 500 may be arranged in the communication 400. As an alternative to the demister 500, the communication 400 may be provided with one or several sharp bends or the like hindering passage of liquid water.

The remaining, not evaporated water is returned to the first water circulation tank 101 via the first outlet 105 of the first scrubber 102. This water will contain particulate matter washed out from the exhaust gases by the water.

The water re-circulated in the first scrubber process loop 100 preferably has a pH value below 4 as measured at the second inlet 108 of the first scrubber 102. Thereby, substantially no removal of SOx from the exhaust gases will take place in the first scrubber 102. Accordingly, the first scrubber process loop 100 is to be regarded as an evaporation loop generating evaporated, pure water that together with the exhaust gases is fed into the second scrubber process loop 200 in the form of humid exhaust gases.

By the circulating flow of water between the first scrubber 102 and the first water tank 101, the heat exchange between the water and the exhaust gases will result in the water reaching a balanced temperature of about 40-70° C. as measured at the second inlet 108 of the first scrubber 102. Thus, the water received by the first scrubber 102 will have a temperature within the range of 40-70° C.

The humid exhaust gases enter the second scrubber 202 via the second inlet 211 thereof. Inside the second scrubber 202 they will meet a counter flow of cold water provided from the nozzles 213. The water is supplied from the second water circulation tank 201. The water circulating in the second scrubber process loop has due to the first heat exchanger 207, a substantially lower temperature than the water circulating in the first scrubber process loop 100. Depending on the temperature of the refrigerant used in the first heat exchanger 207, the temperature of the water circulating in the second scrubber process loop 200 may be in the range of 0-35° C. as measured at the second inlet 206 of the second scrubber 202. Thus, the water received by the second scrubber 202 will have a temperature within the range of 0-35° C. The preferred temperature of the water to be fed to the second scrubber 202 will be further discussed below.

When the flow of humid exhaust gases meets the counter flow of cold water in the second scrubber 202, a heat transfer will occur between the humid exhaust gases and the cold water. As a result thereof, the water vapour in the exhaust gases will condense at least partly and the resulting liquid pure water will intermix with the cold water. Thus, the condensate provides a surplus of pure water to the second scrubber loop 200.

Further, when the flow of humid exhaust gases meets the counter flow of cold water, the exhaust gases react with the alkaline agent in the water circulating in the second scrubber process loop 200, whereby the SOx contained in the exhaust gases is absorbed in the water and oxidizes to sulphates. Thus, the second scrubber process loop is to be regarded as a cleaning loop, where the exhaust gases are cleaned from SOx.

The sulphate containing water exiting the second scrubber 202 is returned to the second water circulation tank 201 via the first outlet 203 of the second scrubber 202. Further, the resulting cleaned exhaust gases will exit the second scrubber 202 via the second outlet 208 where it may be released directly or indirectly into the ambient air via the clean exhaust gas outlet 209.

Some of the water collected in the second water circulation tank 201 is re-circulated back into the second scrubber 202 via the first heat exchanger 207.

Due to the condensation of water in the second scrubber 202, there is a net flow of pure water to the second scrubber process loop 200 from the first scrubber process loop 100. By pure water is here meant water having a low concentration of salts and particulate matter.

A flow of water corresponding to the pure water net flow referred to above is fed as a reflux back to the first scrubber process loop 100 from the second water circulation tank 201 via the communication 300 and/or the communication 300'. The reflux of water contains, due to the scrubbing action in the second scrubber process loop 200 where SOx oxidizes to sulphates, salts and other washed out pollutants. Due to the reflux, these unwanted substances will be concentrated in the water circulating in the first scrubber process loop 100 and may be separated there form at a later stage.

To give an idea of the ratio of water being refluxed from the second scrubber process loop 200 to the first scrubber process loop 100 the following non-binding example is given. The example is based on computer made simulations.

During operation of a 2 MW engine, the water flow in the first scrubber process loop 100 was about 20 m$^3$/h while the water flow in the second scrubber process loop 200 was about 40 m$^3$/h. When the incoming exhaust gases from the engine 104 had a temperature of 300° C., the amount of water evaporating in the first scrubber 102 was 2.6 m$^3$/h. Further, the amount of water condensing in the second scrubber 202 was 2.7 m$^3$/h. The amount of water condensing may be larger than the amount of water evaporating due to the humidity of the ambient air. Thus, the net flow of water to be refluxed to the first scrubber process loop 100 was 2.7/20=13.5% of the water flow in the first scrubber process loop.

The difference in temperature of the water used in the first and the second scrubber process loops 100, 200 will not significantly affect the performance of the first scrubber process loop 100. The simulation referred to above revealed that the water re-circulating in the first scrubber process loop 100 after a while stabilized at a temperature of 63° C. The reflux of water from the second scrubber process loop 200 did not significantly affect this temperature. The simulations indicate a lowering of about 2-4° C.

The cleaning system 1 described above has a major advantage in that it may be operated for a very long time without making any water discharge. However, one limiting factor for operating a closed loop scrubber system is that at some point, the circulating water, here the water circulating in the first scrubber process loop, will be saturated with sulphur in the form of sulphite and sulphate. Then, a thorough cleaning and discharge of the circulating water is required.

The cleaning system may be provided with an additional water cleaning arrangement 600, as is illustrated in the drawing FIGURE. The water cleaning arrangement 600 is arranged in communication with the first separator unit 110. A communication 610 extends from the first outlet 118 of the first separator unit 110 to a second heat exchanger 601 via a valve 611. The second heat exchanger 601 may by way of example use seawater as refrigerant. The second heat exchanger 601 is arranged to cool the remnant water provided from the first separator unit 110 to a temperature below 30° C. The cooled remnant water is collected in a retention tank 602. By the lowered temperature of the remnant water, sodium sulphate contained in the remnant water will precipitate as solids in the form of solid sulphite or solid sulphate. The remnant water is kept in said retention tank 602 for a time sufficient for the precipitation to take place before it is transferred to a second separator unit 603.

The second separator unit 603 separates the solids from the remnant water and the solids are then collected in a collecting tank 604 for a later controlled discharge. The resulting cleaner remnant water is returned to the second scrubber process loop 200 via a communication 605 extending from the second separator unit 603 to the second scrubber 202. Thus, in the disclosed embodiment the cleaner remnant water is returned to the second process loop 200 in a position between the first heat exchanger 207 and the second scrubber 202. It is however to be understood that the remnant water may be returned to the second scrubber loop 200 in other positions.

The second separator unit 603 may in its easiest form be a separator based on sedimentation technology. It is however to be understood that other separator technologies may be used.

By using the water cleaning arrangement 600 in the cleaning system 1 there is no need of making any water discharge due to high concentration of salts, but rather a controlled salt precipitation may be made, and the salt precipitations may be removed by the second separator unit.

Thus, in the cleaning system illustrated in the drawing FIGURE, the first separator unit 110 is fed with water from the first scrubber process loop 100 which separates the dirty water into sludge containing particulate matter and remnant water. This remnant water can either be discharged through the valve 114 or fed to the water cleaning arrangement 600 for separation into salt precipitations and cleaner remnant water.

The preferred temperature of the water to be fed to the second scrubber 202 depends on the amount of water vapor in the exhaust gas from the engine 104 and hence on the ambient humidity, engine fuel as well as on an engine scavenging air cooler if such is present (not disclosed). If there is only little water vapor in the exhaust gas, a high degree of cooling, and thus a relatively low water temperature, is required in order to condense as much water as possible in the second scrubber and thereby avoid having to "top up" with water generated elsewhere. Such "top up" water is usually expensive to generate and only available in limited amounts onboard the ship. If a high degree of cooling is required, and if the first heat exchanger 107 operating with seawater on it's cold side is applied, the water to be fed to the second scrubber 202 is preferable cooled as close as possible to the temperature of the ambient seawater. This is typically 2-6° C. above the ambient sea water temperature. In other situations with high ambient humidity and low seawater temperature, it might be necessary to limit the cooling in order to avoid generating, by condensing, excessive amounts of water in the second scrubber as this water eventually needs to be cleaned and discharged. Thus, the water to be fed to the second scrubber 202 is preferably cooled to a temperature for which there is no net overall consumption or generation of water by the entire cleaning system 1.

Due to changing conditions for a ship sailing around, it might be beneficial to generate excess water in the second scrubber for some periods and then accumulate such excess water in the first and second water circulation tanks or elsewhere for later use when sufficient cooling and hence water generation cannot be gained.

The present invention allows the first scrubber process loop to be operated at a low pH value. If for example a pH value of 6.5 is maintained as measured at the second inlet 108 of the first scrubber 102, the molar reaction ratio between sodium and sulphur and thereby also the operational cost of the scrubber may be reduced as compared to operating the first scrubber process loop at a pH value above 7 which is considered as normal in the art for wet-scrubbers of the closed-loop type. In one extreme, the pH value could be lowered to less than 2. Under these circumstances, the sulphur would be bound as sodium-hydrogen sulphate instead of sodium sulphate. The consequence would be that the reaction rate between sodium and sulphur would be 1:1 instead of the normal 2:1, which would give operational costs only half of normal levels.

In case sufficient oxygen is present, a complete oxidation of the absorbed sulphur is expected according to the following reactions:

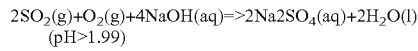
(pH>1.99)

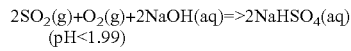
(pH<1.99)

As the second acid constant for sulphuric acid is 1.99, the sulphur oxide will mainly appear as bisulphate ($HSO_4^{1-}$) instead of sulphate ($SO_4^{2-}$) in the water.

All of the communications referred to above may comprise suitable piping.

It is to be understood that there are numerous scrubbers available and the invention should not be limited to the disclosed examples of the first and second scrubbers.

In one embodiment, an arrangement for supply of a coagulant (not disclosed) may be arranged in a position between the first water circulation tank 101 and the first separator unit 110. The coagulant, typically in the form of a trivalent metal ion such as Aluminum or Iron, may be used to improve the performance of the first separator unit 110, by the coagulant forming chemical compounds where the particulate matter is connected to metal salts. Such chemical compounds are heavier and easier to separate by the first separator unit 110 than "free" particulate matter.

Also, it should be stressed that the present invention alternatively or additionally may be used for cleaning flue gases from an oil fired burner or a boiler.

It will be appreciated that numerous variants of the above described embodiments of the present invention are possible within the scope of the appended claims.

The invention claimed is:

1. Cleaning system for the reduction of SOx and particulate matter in exhaust gases from a marine combustion engine, burner or boiler, the cleaning system comprising:
   a first scrubber process loop comprising a first scrubber and a first water circulation tank, wherein water from the first water circulation tank is arranged to circulate in the first scrubber process loop, the first scrubber being arranged to receive exhaust gases from the combustion engine, burner or boiler and water from the first water circulation tank, which water, at least partly, is arranged to be evaporated to water vapor inside the first scrubber by contact with the exhaust gases, whereby the water vapor and the exhaust gases form humid exhaust gases;
   a second scrubber process loop comprising a second scrubber and a second water circulation tank, wherein water from the second water circulation tank is arranged to circulate in the second scrubber process loop,
   a communication between the first and the second scrubber allowing transfer of the humid exhaust gases from the first scrubber to the second scrubber; the second scrubber being arranged to receive water from the second circulation tank, which water is arranged to condensate, inside the second scrubber, the water vapor in the humid exhaust gases at least partly; and
   a communication between the first and the second scrubber process loop allowing a reflux of water from the second scrubber process loop to the first scrubber process loop,
   the cleaning system further comprising an arrangement for supply of an alkaline agent to at least the second scrubber process loop, wherein at least 60% of the total amount of the alkaline agent supplied to the cleaning system is supplied to the second scrubber process loop.

2. The cleaning system according to claim 1, wherein the second scrubber process loop comprises a first heat exchanger adapted to cool the water being arranged to circulate in the second scrubber process loop.

3. The cleaning system according to claim 1, adapted to maintain a temperature of the water arranged to be received by the second scrubber in the range of 0-35° C.

4. The cleaning system according to claim 1, adapted to maintain a temperature of the water arranged to be received by the first scrubber in the range of 40-70° C.

5. The cleaning system according to claim 1, adapted to adjust the supply of the alkaline agent to the second scrubber process loop such that a pH value of the water arranged to be received by the second scrubber is in the range of 6-10.

6. The cleaning system according to claim 1, adapted to maintain a pH value of the water arranged to be received by the first scrubber in the range of 2-8.

7. The cleaning system according to claim 1, further comprising a first separator unit communicating with the first scrubber process loop.

8. The cleaning system according to claim 7, further comprising a water cleaning arrangement adapted to be supplied with remnant water from the first separator unit, wherein the water cleaning arrangement comprises a second heat exchanger adapted to cool the remnant water in order for salts contained therein to precipitate, and a second separator unit adapted to separate the precipitated salts from the cooled remnant water.

9. Method of reducing SOx and particulate matter in exhaust gases from a marine combustion engine, burner or boiler by using a cleaning system, the cleaning system comprising:
   a first scrubber process loop comprising a first scrubber and a first water circulation tank;
   a second scrubber process loop comprising a second scrubber and a second water circulation tank;
   a communication between the first and the second scrubber;
   a communication between the first and the second scrubber process loop; and
   an arrangement for supply of an alkaline agent to at least the second scrubber process loop; the method comprising:
      circulating water from the first water circulation tank in the first scrubber process loop,
      circulating water from the second water circulation tank in the second scrubber process loop,
      supplying at least 60% of the total amount of the alkaline agent supplied to the cleaning system to the second scrubber process loop,
      receiving exhaust gases from the combustion engine, burner or boiler, and water from the first water circulation tank, in the first scrubber, which water, at least partly, is evaporated to water vapor inside the first scrubber by contact with the exhaust gases, whereby the water vapor and the exhaust gases form humid exhaust gases, transferring the humid exhaust gases from the first scrubber to the second scrubber, receiving water from the second circulation tank in the second scrubber, which water condensates, inside the second scrubber, the water vapor in the humid exhaust gases at least partly, whereby SOx contained in the exhaust gases oxidizes into sulphates; and providing a reflux of water from the second scrubber process loop to the first scrubber process loop.

10. The method of claim 9, comprising adjusting the supply of the alkaline agent to the second scrubber process loop such that a pH value of the water received in the second scrubber is in the range of 6-10.

11. The method of claim 9, comprising maintaining a pH value of the water arranged to be received in the first scrubber in the range of 2-8.

12. The method of claim 9, further comprising cooling the water arranged to be received in the second scrubber to a temperature in the range of 0-35° C.

13. The method of claim 9, further comprising maintaining a temperature of the water arranged to be received in the first scrubber in the range of 40-70° C.

14. Use of a cleaning system comprising operating the cleaning system according to claim 1 while the cleaning system is onboard a ship for the purpose of reduction of $SO_x$ and particulate matter in exhaust gases from a marine combustion engine, burner or boiler located onboard the ship.

15. The cleaning system according to claim 1, wherein at least 90% of the total amount of the alkaline agent supplied to the cleaning system is supplied to the second scrubber process loop.

16. The cleaning system according to claim 1, wherein the cleaning system is adapted to adjust the supply of the alkaline agent to the second scrubber process loop such that the pH value of the water arranged to be received by the second scrubber is in the range of 7-8.

17. The cleaning system according to claim 1, wherein the cleaning system is adapted to maintain a pH value of the water arranged to be received by the first scrubber in the range of 2-4.

18. The method of claim 9, wherein the supplying of at least 60% of the total amount of the alkaline agent supplied to the cleaning system to the second scrubber process loop comprises supplying at least 90% of the total amount of the alkaline agent supplied to the cleaning system to the second scrubber process loop.

19. The method of claim 9, wherein the adjusting of the supply of the alkaline agent to the second scrubber process loop comprises adjusting the supply of the alkaline agent to the second scrubber process loop such that the pH value of the water received in the second scrubber is in the range of 7-8.

20. The method of claim 9, wherein the maintaining of the pH value of the water arranged to be received in the first scrubber comprises maintaining the pH value of the water arranged to be received in the first scrubber in the range of 2-4.

* * * * *